US009538897B2

(12) United States Patent
Peukert et al.

(10) Patent No.: US 9,538,897 B2
(45) Date of Patent: Jan. 10, 2017

(54) DISHWASHER WITH LOW-TEMPERATURE FINAL WASHING

(71) Applicant: Meiko Maschinenbau GmbH & Co. KG, Offenburg (DE)

(72) Inventors: Thomas Peukert, Buehl (DE); Hans-Josef Rauber, Oberhamersbach (DE); Vera Schneider, Offenburg (DE); Stefan Scheringer, Offenburg (DE)

(73) Assignee: Meiko Maschinenbau GmbH & Co. KG, Offenburg (DE)

( * ) Notice: Subject to any disclaimer, the term of this patent is extended or adjusted under 35 U.S.C. 154(b) by 0 days.

(21) Appl. No.: 14/736,299

(22) Filed: Jun. 11, 2015

(65) Prior Publication Data
US 2015/0272420 A1 Oct. 1, 2015

Related U.S. Application Data

(62) Division of application No. 12/565,191, filed on Sep. 23, 2009, now Pat. No. 9,078,553.

(30) Foreign Application Priority Data

Sep. 23, 2008 (DE) ........................ 10 2008 048 491

(51) Int. Cl.
*A47L 15/42* (2006.01)
*A47L 15/00* (2006.01)
(Continued)

(52) U.S. Cl.
CPC ........ *A47L 15/0007* (2013.01); *A47L 15/0005* (2013.01); *A47L 15/0015* (2013.01);
(Continued)

(58) Field of Classification Search
CPC .................................................... A47L 15/005
See application file for complete search history.

(56) References Cited

U.S. PATENT DOCUMENTS 4,156,621 A * 5/1979 Andrews ............. A47L 15/4291
134/10
4,277,290 A 7/1981 Andrews et al.
(Continued)

FOREIGN PATENT DOCUMENTS

DE 43 05 020 A1 8/1994
DE 4305020 A1 * 8/1994
(Continued)

OTHER PUBLICATIONS

English machine translation of DE4305020A1.*

*Primary Examiner* — Michael Barr
*Assistant Examiner* — Jason Riggleman
(74) *Attorney, Agent, or Firm* — Muncy, Geissler, Olds & Lowe, P.C.

(57) ABSTRACT

A method and apparatus for cleaning washware, in particular dishes, is provided. In the process, the washware is subjected to at least one wash process in which adhering dirt is at least largely removed. The washware is then subjected to a final-washing process which has at least two substeps. The washware is acted on by a first rinse liquid in a first substep, with the first rinse liquid containing a disinfectant. The washware is acted on by a second rinse liquid in a subsequent second substep, with the second rinse liquid comprising at least one permeate which is produced by reverse osmosis.

6 Claims, 2 Drawing Sheets

(51) Int. Cl.
*B01D 61/02* (2006.01)
*C02F 1/44* (2006.01)
*C02F 103/04* (2006.01)

(52) U.S. Cl.
CPC ....... *A47L 15/0055* (2013.01); *A47L 15/4236* (2013.01); *A47L 15/4217* (2013.01); *A47L 15/4285* (2013.01); *A47L 2401/023* (2013.01); *A47L 2501/26* (2013.01); *B01D 61/025* (2013.01); *C02F 1/441* (2013.01); *C02F 2103/04* (2013.01)

(56) References Cited

U.S. PATENT DOCUMENTS

| | | | |
|---|---|---|---|
| 4,313,451 A | | 2/1982 | Vilen |
| 4,481,086 A | * | 11/1984 | Bianchi ............... A47L 15/4229 134/11 |
| 5,401,421 A | | 3/1995 | Blum |
| 7,871,521 B2 | | 1/2011 | Monsrud et al. |
| 2006/0266381 A1 | | 11/2006 | Doherty et al. |
| 2007/0295665 A1 | | 12/2007 | Ayala et al. |
| 2008/0210263 A1 | | 9/2008 | Brunswick et al. |
| 2010/0084340 A1 | * | 4/2010 | Monsrud ............. A47L 15/0002 210/652 |

FOREIGN PATENT DOCUMENTS

| | | | |
|---|---|---|---|
| EP | 1 704 810 A1 | | 9/2006 |
| EP | 1704810 A1 | * | 9/2006 |
| WO | 0 133 677 A2 | | 3/1985 |
| WO | WO 2007/021786 A2 | | 2/2007 |

* cited by examiner

DISHWASHER WITH LOW-TEMPERATURE FINAL WASHING

This nonprovisional application is a divisional of U.S. application Ser. No. 12/565,191 filed Sep. 23, 2009, which claims priority under 35 U.S.C. §119(a) to German Patent Application No. 10 2008 048 491.1, which was filed in Germany on Sep. 23, 2008, and which are both herein incorporated by reference.

BACKGROUND OF THE INVENTION

Field of the Invention

The invention relates to a method and to a cleaning apparatus for cleaning washware. Such methods and cleaning apparatuses are used for cleaning washware of all types in various areas of daily life, in hospitals and in the care sector, for cleaning machine parts and other types of washware in industry, and also in various areas of medicine and natural sciences. Without restricting possible further uses, the invention will be described below in particular with reference to dishwashers which are designed to clean dishes, for example glasses, cups, cutlery, plates, trays or other types of articles which can come into direct or indirect contact with food and drink or which can be used for food preparation.

Description of the Background Art

Cleaning apparatuses for cleaning various types of washware are known from various areas of daily life, natural sciences and technology, medicine and also other areas. The following description relates, in particular, to dishwashers in which dishes of the type described above are acted on by cleaning liquids of various types as part of a program sequence. This can be performed, in particular, in a cleaning chamber. Various types of dishwashers are known from the prior art. In principle, a distinction is first drawn between single-chamber and multi-chamber dishwashers. The invention described in the text which follows is, in principle, suitable for all types of dishwashers but can be used particularly advantageously for single-chamber dishwashers in which the washware is not transported during the cleaning process. Cleaning programs with one or more cleaning steps can be executed in dishwashers of this type.

A further distinction can be drawn between dishwashers for the domestic sector and dishwashers for commercial use. Whereas the first-mentioned dishwashers are generally equipped with a so-called single-circuit system, in which the same cleaning circuit is used for the actual cleaning process (also called wash process in the text which follows) and a final-washing process, dishwashers for commercial use are generally designed in the form of two-circuit cleaning apparatuses. In two-circuit cleaning apparatuses of this type, a two-circuit washing system is provided, in which at least partly separate washing systems are provided for the wash process and the final-washing process. The present invention can, in principle, again be used for all types of dishwashers, but it is particularly preferably used in commercial dishwashers with two-circuit washing systems.

DE 43 05 020 A1 discloses a domestic dishwasher with a washing program which is made up of several program substeps. The dishwasher comprises a reverse-osmosis device in which the introduced water is converted partly into permeate and partly into concentrate. In this case, the permeate is used as washing liquid in a "rinsing" program substep.

Commercial dishwashers usually have a tank system in which a washing liquor for a wash process is stored. This washing liquor is repeatedly used, without being discarded after a cleaning cycle, to clean washware which has been introduced, in order to clean adhering particles of dirt from said washware. Following the wash process or cleaning process, fresh water which has been heated in a boiler or a flow heater is applied to the washware via an additional rinsing system. This introduced rinse water generally has at least one rinse agent added and is entirely or partly used to regenerate the washing liquor for the wash process. EP 0 133 677 A2 discloses a method and apparatus for demineralizing water for a dishwasher. In this case, water which is used for a third washing step is demineralized by means of reverse osmosis.

Commercial dishwashers with a two-circuit system are mainly used in establishments with a high throughput of washware, for example in restaurants or in canteens in factories, hospitals, offices, schools, care homes or similar facilities. One reason for this is, in particular, that machines of this type are distinguished by very short cycle times, for example cycle times of from less than 60 seconds to a few minutes. In this respect, dishwashers of this type are designed for a high throughput.

In order to achieve a required hygiene effect for washware despite the high throughput, there are two important procedures. One procedure, which is used primarily in European countries, uses fresh water for rinsing, said fresh water having been heated to a high temperature. Temperatures in the region of approximately 85° C. are normally used. This rinse water is enriched with a rinse agent and then a sufficient quantity is sprayed onto the freshly cleaned washware, for example dishes, so that a thermal hygiene effect is produced in addition to a washing-off effect for removing adhering wash liquor. At the end of the cleaning program, the washware is then in a satisfactory state both from a visual and a sensory and hygiene point of view.

In an alternative method which is primarily used in and around North America, for example in the USA, a predominantly thermochemical hygiene effect is aimed at. This is achieved by the rinse water being heated to a comparatively low temperature. For example, temperatures of approximately 49° C. can be used here. However, at the same time, a disinfectant, for example a rinse agent with a proportion of disinfectant, is added to the rinse water. Customary disinfectants of this type are disinfectants based on chlorine which are also called "sanitizers". The use of such sanitizers, including the required concentrations of sanitizer for correct operation, are described, for example, in the so-called NSF3 standard. One advantage of this second alternative is that the energy consumed for heating the rinse water is considerably lower than in the first-described method. In addition, somewhat shortened program run times result, this occurring primarily on account of the reduced heating times and/or reduced cooling times of the washware. A further important advantage of low-temperature rinsing is that thermally sensitive washware, in particular drinking glasses, are subjected to a lower thermal load and therefore are exposed to a lesser risk of damage. In addition, the washware, for example the glasses, can be reused quickly since shorter cooling times are required for this washware than in the case of the described first method.

However, an important disadvantage of the thermochemical method is that the washware, for example drinking glasses, in many cases have often absorbed the smell of the disinfectant at the end of the program and, for example, an intense odour of chlorine is produced. This distinctive sensory characteristic is highly pronounced and long-lasting in many cases, and therefore the smell and taste of drinks which are later poured into glasses which have been treated in this way can be adversely affected to a great extent.

Both known methods therefore have associated disadvantages. Whereas the high-temperature final-washing process is predominantly associated with disadvantages in terms of energy, the thermochemical final-washing method has a pronounced adverse effect on the environment and sensorily influences the washware.

In addition, the prior art describes numerous washing methods which have the purpose of, in particular, improving the cleaning effect and/or saving washing liquid. U.S. Pat. No. 5,401,421, for example, describes a dishwasher with a reverse-osmosis apparatus. The reverse-osmosis apparatus is used to recondition used washing liquid and feed it back to the washing systems. However, apparatuses of this type do not, in principle, solve the above-described problem of known final-washing processes which either operate in a comparatively energy-inefficient manner or are associated with a strong adverse effect on the environment or on the washware.

SUMMARY OF THE INVENTION

It is therefore an object of the present invention to provide a method and a cleaning apparatus for cleaning washware, which method and apparatus at least largely avoid the above-described disadvantages of known methods and apparatuses. In particular, a hygienically satisfactory washing result should also be achieved at low final-washing temperatures, in the case of which the washware is of a high enough quality from an optical and sensory point of view following the washing process.

This object is achieved, in an embodiment, by a method and a cleaning apparatus having the features of the independent claims. Advantageous developments of the invention, which can be implemented both individually and in combination, are described in the dependent claims. In this case, the proposed cleaning apparatus is preferably designed to carry out a method according to the invention, and the method uses a cleaning apparatus according to the invention. In this respect, reference may be made to the description of the cleaning apparatus for possible embodiments of the method, and to the description of the method for possible embodiments of the cleaning apparatus. For example, method features can be implemented in the cleaning apparatus by corresponding apparatuses for carrying out these method features.

The method and the cleaning apparatus serve to clean washware, in particular washware of the type described above. Without restricting further use options, the text which follows describes, in particular, the use for cleaning dishes since the advantages of the invention are particularly noticeable in dishwashers. In particular, these dishwashers may be commercial dishwashers, that is to say dishwashers with two-circuit systems.

In the proposed method, the washware is subjected to at least one wash process. In this case, a wash process is to be understood as a process in which dirt which adheres to the washware is at least largely removed. This dirt may be, for example, food residues or other impurities. In order to carry out this wash process, the cleaning apparatus may have, for example, at least one cleaning chamber in which the washware is acted on by a wash liquid. This wash liquid may be, for example, water with one or more detergent additives, this mixture also being called wash liquor. By way of example, the cleaning apparatus can have a wash circuit for carrying out the wash process, for example a wash circuit in which the washware is washed with circulation operation by means of a circulation pump. As described above, it is particularly preferred when the cleaning apparatus comprises only one such cleaning chamber, that is to say is in the form of a single-chamber cleaning apparatus. However, another refinement is also possible in principle.

The wash process may also comprise a plurality of wash subprocesses, for example wash processes with different degrees of purity of the wash liquid and/or with differing compositions of the wash liquid. Various refinements are possible.

After the end of the wash process, the washware is subjected to at least one final-washing process. This final-washing process serves, in particular, to remove residues of the washware adhering to the washware and to ensure that the washware is satisfactorily dried. In this case, the invention proposes solving the above-described problem by dividing the final-washing process into at least two substeps. However, more than two substeps can be provided. In this case, the washware is acted on by a first rinse liquid in a first substep. A rinse liquid is understood to mean a liquid which is suitable for removing adhering wash liquid from the washware. This rinse liquid may comprise, for example, one or more rinse agents, that is to say surfactants which produce a residue-free drying effect. However, such surfactants can also be completely dispensed with within the scope of the present invention. The first substep of the final-washing process can be carried out with circulation operation, but is preferably carried out in a single operation in which the rinse liquid is not recirculated but is applied to the washware, for example sprayed onto the washware, only once.

The invention provides for the first rinse liquid to contain a disinfectant. Here, within the scope of the present invention, a disinfectant is a substance which has a clear bacteria-reducing effect. By way of example, disinfectants based on chlorine and/or other types of disinfectants may be used in this case. The above-described disinfectant according to the NSF3 standard or another standard may be used. In this respect, the proposed method and the correspondingly designed cleaning apparatus correspond, for example, to methods and apparatuses according to the NSF3 standard, with the exception that the use of rinse-agent additives in the first rinse liquid is not necessarily required, as will be demonstrated in the text which follows.

According to the invention, the at least one first substep is followed indirectly or directly by at least one second substep in the final-washing process. In this second substep, the washware is acted on by a second rinse liquid. This second rinse liquid comprises at least one permeate which is produced by means of reverse osmosis.

In this example, reverse osmosis can be understood to mean a physical/chemical method for concentrating substances which are dissolved in liquids, in which a natural osmosis process is reversed by means of the application of pressure. In this case, at least one semi-permeable membrane is used, said membrane separating a concentrate, in which the concentration of at least one substance is to be increased, from the so-called permeate, in which the concentration of the substance is to be reduced. In this case, the concentrate is exposed to an elevated pressure which is generally higher than the osmotic pressure under the given conditions. As a result, the permeate constituents, to which the membrane is permeable, migrate into the area of the permeate against their osmotic propagation direction, the dissolved substances, for example impurities, already being less concentrated and/or not present at all in said area.

Water, preferably drinking water, is particularly preferably used as the basis for producing the permeate, and therefore the permeate is preferably ultrapure water. At least one membrane is preferably used, said membrane being permeable to water molecules but impermeable to at least one impurity. This at least one impurity, to which the membrane is impermeable, preferably contains at least one mineral constituent of drinking water, for example salts, carbonates, sulphates or similar constituents or fractions of the said and/or other substances, for example ions such as carbonate ions, sulphate ions or similar ions. In particular, the impurities may therefore be impurities which can usually lead to visible residues, for example so-called "limescale residues" on dishes, in particular glasses, upon drying. The permeate is therefore particularly suitable for ensuring residue-free drying of the washware, even without the addition of rinse-agents. Multi-stage reverse-osmosis processes can also be used.

The method according to the invention and the cleaning apparatus according to the invention have a large number of advantages over conventional methods and apparatuses. Therefore, by way of example, the advantages of the thermochemical low-temperature final-washing method, for example in accordance with the NSF3 standard, are combined with the advantages of high-temperature rinsing. The thermochemical hygiene effect, which is created by the at least one disinfectant, is at least predominately taken over by the first substep and, with a time difference, by the effect of residue-free washing-off and/or rinsing of the washware, this being taken over at least largely by the second substep. As a result, the desired hygienization can be achieved in the first instance in the first substep, followed by the second substep in which disinfectant residues can again be removed without leaving residues, so that the washware is in a sensorily satisfactory state.

It is particularly preferred here when the second rinse liquid is substantially free of rinse-aid additives. In this case, "substantially free" can be understood to mean a state in which the second rinse liquid does not have a rinse agent deliberately added as rinse aid, in particular no surfactant is added. Only excess rinse-aid additives, for example rinse-aid additives adhering to pipe inner walls, can still be present in the second rinse liquid. The use of the permeate which is produced by reverse osmosis and preferably has a conductance of less than 100 μS, in particular of less than 80 μS, ensures that no drying spots, for example limescale spots, can be produced on the washware, even without the corresponding surfactants as rinse-aid additives. In this respect, for example, pure permeate, in particular ultrapure water which is produced by reverse osmosis, can be used as the second rinse liquid. The first advantage of the use of permeate, in particular ultrapure water, as the second rinse liquid or at least as a constituent of the second rinse liquid for final-washing, in particular for rinsing in glasswashers, is that the washware can be dried such that it is virtually completely free of spots or other visual impairments.

Another advantage of the use of permeate, in particular ultrapure water, as the second rinse liquid is that the temperature at which the second rinsing step is carried out can be low, for example 40° C. to 50° C., since the permeate from the reverse-osmosis process is not only at least virtually free of dissolved substances but, in principle, is also at least virtually free of bacteria. Since the permeate which is used for final washing is preferably not stored for long periods of time but is produced shortly before it is required, recontamination can be excluded, despite the low temperatures. Therefore, the second rinse liquid can be heated, for example, to a temperature of between 24° C. and 90° C., in particular to a temperature of between 40° C. and 55° C., and particularly preferably to a temperature of 49° C.

As already indicated above, the first substep can generally be carried out at low temperatures. It is particularly preferred when the first substep is carried out with the first rinse liquid at a temperature of between 24° C. and 90° C., in particular between 40° C. and 70° C., and particularly preferably is approximately 49° C. In this respect, the known NSF3 standards can continue to be used. In exceptional cases, the NSF3 standard even permits a temperature of only 24° C. The proposed cleaning apparatus and the proposed method therefore preferably meet, as before, the NSF3 standard and accordingly can fit in with known standards and protocols without problems.

In principle, the division of the final-washing process into the at least two substeps with the at least two rinse liquids can increase the total quantity of rinse liquid compared to known methods. This can be done, in particular, by, on account of the method, a specific quantity of concentrate being produced in proportion to the pure permeate, and this can increase the water consumption of the cleaning apparatus compared to rinsing with normal fresh water from an on-site water supply. The ratio of permeate to concentrate may be, for example, 1:1 parts by volume. This could lead, for example, to water consumption by a glasswasher of this type of, for example, 2.5 liters per washing cycle according to the prior art nominally rising to 7.5 liters per washing cycle, this being caused by the addition of the second substep, including the required quantity of concentrate from reverse osmosis. However, on account of the final-washing process or rinsing process (the two terms are used largely synonymously within the scope of the present invention) being in two parts, the quantity of rinse liquids for the individual substeps can, in principle, be reduced, and therefore, for example, a washing cycle according to the method of the invention can make do with at least approximately the same quantity of rinse liquid as conventional methods. By way of example, a washing cycle according to the method of the invention can be carried out with a total of 3.0 liters of rinse water plus the produced quantity of concentrate from reverse osmosis.

However, according to the invention, the concentrate from reverse osmosis can also be used, so that this fraction can also be gainfully employed. Therefore, this concentrate, which is produced during reverse osmosis, can be used, for example, in the at least one wash process or in at least one substep of the at least one wash process. However, it is particularly preferred when the first rinse liquid comprises the concentrate which is produced during reverse osmosis. By way of example, this concentrate can be used, with or without the addition of further liquids, for example water, and can be enriched by the at least one disinfectant to form the at least one first rinse liquid. Since the at least one second substep follows the first substep of the final-washing process, the fact that the concentrate has a higher concentration of impurities, for example mineral constituents, plays a subordinate role. Impurities of this kind are washed off in the at least one, subsequent second substep and do not impair the washing result. In this way, clever division of the untreated water into the concentrate and the permeate and the division of the final-washing process into two means the rinse liquids can each be adapted in an optimized manner to the respective requirement in the present substep. As a result, in conjunction with the above-described division between hygienization and optimum drying, the washing result can be additionally improved in visual and sensory respects. In particular, this is again positively noticeable in glasswashers.

A method, for example a washing method for glasswashers, can therefore be provided with this additional modification, said method achieving a considerably improved final-washing result, in particular in terms of the sensory requirements, with low to virtually non-existent additional outlay on rinse liquid, for example fresh water, compared to cleaning apparatuses with low-temperature rinsing according to the prior art.

In another embodiment of the proposed method, a quantity and/or concentration of the disinfectant which is added in a metered manner to the first rinse liquid is detected. By way of example, a quantity of rinse agent with a disinfectant component, which is metered into the first rinse liquid, is detected by means of at least one sensor. Direct detection of the concentration of the disinfectant, for example of the rinse agent with a disinfection component, in the first rinse liquid is also possible, for example by means of a corresponding sensor. A sensor of this type may be in the form, for example, of a throughflow sensor, an optical concentration sensor, an electrical concentration sensor (for example a conductivity sensor) or as a similar type of sensor. Combinations of sensors are also possible.

The cleaning apparatus can comprise, for example, a control system. Accordingly, the method can be designed to generate a signal when the quantity and/or concentration deviate/deviates from a desired value and/or desired range. This signal may be, in particular, an acoustic signal, an optical signal or an electrical signal or a combination of said signal types and/or other types of signals. In this way, a user can, for example, be informed of the deviation which has occurred. It is also possible, as an alternative or in addition, to provide a correspondingly designed regulation system. This regulation system can, for example, be used to make adjustments, so that the quantity and/or concentration are/is readjusted to the desired value and/or desired range. As an alternative or in addition, it is possible, for example, for this adjustment to be made, in principle, by a operator of the cleaning apparatus, said operator being made aware of the deviation by the at least one signal.

Further preferred refinements of the invention concern the design of the cleaning apparatus, but with this also, as described above, producing corresponding possible refinements of the method.

For example, the cleaning apparatus can interact with at least one external reverse-osmosis system, for example can be connected to an on-site reverse-osmosis system. However, as an alternative or in addition, the cleaning apparatus can also comprise at least one reverse-osmosis system as an integral constituent part. This reverse-osmosis system may be, for example, a commercially available reverse-osmosis system and can be connected to a fresh-water line, for example a fresh-water supply line which is provided on site. This reverse-osmosis system is intended to produce permeate, with the cleaning apparatus being designed to use the said permeate for the second substep.

The cleaning apparatus can also comprise one or more intermediate storage means for temporarily storing the permeate and/or a concentrate which is produced during reverse osmosis. This at least one intermediate storage means can be formed separately, but can also be fully or partly combined with one or more final-washing tanks, for example with a first final-washing tank for accommodating the first rinse liquid and/or with a second final-washing tank for accommodating the second rinse liquid. It is therefore possible, for example, for the first final-washing tank to be used as an intermediate storage means for the concentrate.

Furthermore, the cleaning apparatus can comprise one or more heating apparatuses. The cleaning apparatus may therefore have, in particular, one or more heating apparatuses for heating the first rinse liquid, in particular the concentrate. This heating apparatus can be designed in different ways, for example in the form of a boiler. However, other refinements are also possible.

As described above, the invention can be used, in particular, for cleaning apparatuses in the field of commercial washing. The cleaning apparatus may therefore be in the form, in particular, of a single-chamber cleaning apparatus and can comprise a cleaning chamber and be designed to subject the washware in this cleaning chamber to the wash process and the final-washing process. However, as described above, applications in the field of multi-chamber cleaning apparatuses are also feasible in principle.

It is particularly preferred, in particular for use in the field of commercial dishwashing in large kitchens, when the cleaning apparatus is in the form of a two-circuit cleaning apparatus. Accordingly, the cleaning apparatus can comprise one wash circuit for carrying out the wash process and one final-washing circuit, which is at least partly separate from the wash circuit. In this case, "at least partly separate" is understood to mean that at least one component of the wash circuit, in particular at least one tank, differs from the final-washing circuit. It is also possible to provide a plurality of wash circuits and/or a plurality of final-washing circuits. The wash circuit preferably comprises at least one wash tank which may, for example, be in the form of a floor region of the cleaning chamber. The final-washing circuit accordingly comprises at least one final-washing tank which is separate from the wash tank and may, for example, be in the form of a boiler. Other types of design for the at least partly separate final-washing circuits are also feasible. Different nozzle systems can be used for the wash circuit and for the final-washing circuit, or the same nozzles can be used both for the wash process and for the final-washing process.

As described above, the final-washing process is divided into two according to the invention, with the second step, using the reverse-osmosis permeate, following the first substep. In order to avoid time delays when producing the permeate, which time delays could lead to a considerable extension of the length of the final-washing process, it is particularly preferred when the cleaning apparatus has an intermediate storage means for storing the permeate which is produced during reverse osmosis. As an alternative or in addition, this permeate could also be stored in an external intermediate storage means, for example an external intermediate storage means of an external reverse-osmosis system.

This idea of intermediate storage of the permeate can be combined in a particularly advantageous manner with a further advantageous refinement of the invention, but it also being possible for the said further advantageous refinement to be realized independently. For example, the cleaning apparatus can comprise a heating apparatus for heating the second final-washing liquid, in particular the permeate. This heating apparatus may be in the form of, for example, a boiler, but it also being possible to use other heating apparatuses, for example flow heaters, as an alternative or in addition. If a boiler, for example a pressureless or pressurized boiler is used, this boiler can, at the same time, be used as an intermediate storage means for temporarily storing the permeate or the second rinse liquid. The second rinse liquid may already be heated in this boiler, for example while the first substep of the final-washing process is running. In this way, it is possible for the second substep to follow the first substep, for example without a time delay. However, other refinements are also feasible in principle, for example refinements in which the same boiler is used sequentially for the first rinse liquid and the second rinse liquid. However, separate tanks for these at least two rinse liquids are preferred.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
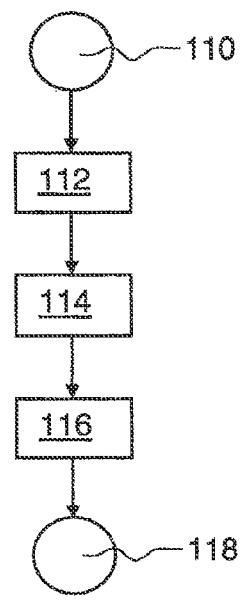
FIG. 1 shows a schematic illustration of a program sequence of a dishwasher with conventional low-temperature final washing.

FIG. 1 shows a schematic flow chart of a conventional method for cleaning washware. The method corresponds to a program sequence with conventional low-temperature rinsing.

The washing program starts in method step 110, for example by an operator actuating a start key after loading a cleaning chamber. Automatic program start 110 is also possible in principle.

A wash process is carried out in a subsequent method step 112, said wash process also being called a cleaning process. During this wash process 112, the washware is cleaned, for example by circulation of wash liquid (also called washing liquid or wash liquor) which can be stored, for example, in a wash tank. By way of example, this wash tank may also be in the form of a floor region of the cleaning chamber.

A draining phase during which wash liquid can drain from the washware optionally follows in step 114.

A final-washing process 116 follows the draining phase 114 in step 116 according to FIG. 1. In this final-washing process 116, the washware which is cleaned in the wash process 112 is subjected to final washing or rinsing with rinse liquid, before the end of the cleaning program is reached at method step 118. The end may be brought about automatically and can be displayed to a user, for example in a display, for example a clear text display and/or by means of a lamp and/or by means of an acoustic signal.

In the case of the described low-temperature rinsing, fresh water is usually heated to a temperature of, for example, 49° C. in the final-washing process 116. In order to achieve the required hygiene effect on the washware, a rinse agent is added to the rinse liquid, said rinse agent generally containing disinfectant based on chlorine. This enriching supplement is added, for example, by means of a metering device which is incorporated in the dishwasher or which may be in the form of a separate physical unit and can be operatively connected to a control system of the dishwasher. Such rinse agents with disinfectants, which are also called "sanitizers", are listed, for example for the USA, in the NSF3 standard. The said standard also prescribes the concentrations which have to be complied with for correct operation. In order to meet the hygiene requirements and also the requirements of user protection, only means which meet this standard can be used in the USA for example.

Despite the requirements of the NSF3 standard, these rinse agents with disinfectants leave residues on the washware, for example drinking glasses, at the program end 118, these residues often smelling strongly of chlorine. This distinctive sensory characteristic is so highly pronounced and long-lasting that the smell and taste of drinks which are later poured into these glasses can be adversely affected to a great extent.

Figure 2:
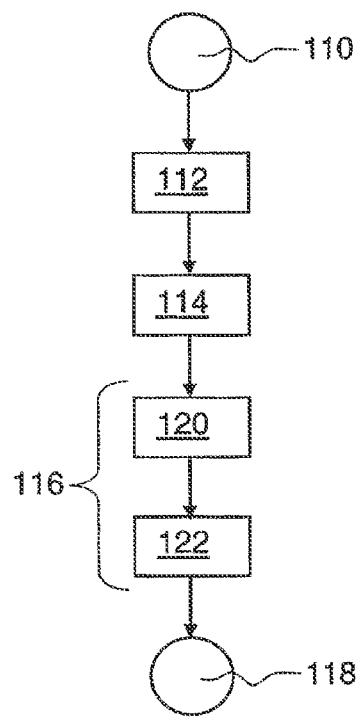
FIG. 2 shows a schematic illustration of a program sequence of a dishwasher with a low-temperature final-washing according to the invention.

In contrast, the illustration according to FIG. 2 shows a schematic flowchart of a sequence according to the invention for cleaning washware. This method is also explained in the text which follows using the example of a program for cleaning dishes in a dishwasher. The illustrated method steps are preferably carried out in the illustrated order, but other orders are also possible in principle. It is also possible to carry out additional method steps which are not illustrated in FIG. 2. Furthermore, it is also possible for individual or even a plurality of method steps to be carried out in parallel or overlapping with respect to time or to be carried out repeatedly. Division of individual method steps into a plurality of substeps is also feasible.

The method according to the invention again starts with low-temperature rinsing in step 110. By way of example, this can again be performed by an operator of the dishwasher actuating a start key after loading the cleaning chamber.

The washware is then again cleaned in a wash process in step 112. In this case, washing liquid or wash liquid which is already stored in a wash tank is generally once again circulated in this case. It is also feasible to divide the wash process 112 into several substeps, for example into primary cleaning, followed by the actual wash process. Various refinements are possible.

A draining phase is again optionally carried out in method step 114 in order to allow the wash liquid to drain from the washware. A final-washing process 116 is then carried out. In contrast to the conventional method according to FIG. 1, this final-washing process 116 is divided into two.

For example, the washware which is cleaned in the wash process 112 is acted on by a first rinse liquid and rinsed in a first substep 120. This first rinse liquid may be, for example, fresh water and is preferably heated to a temperature of, for example, 49° C., as in the case of conventional low-temperature rinsing according to FIG. 1. In order to achieve the required hygiene effect on the washware, this first rinse liquid again contains a disinfectant, for example a disinfectant based on chlorine. As described above, this disinfectant may be, for example, a constituent of a rinse agent with added disinfectant. This disinfectant is added to the first rinse liquid, for example to the fresh water. The enriching supplement may be added, for example, by means of a metering device which is incorporated in the dishwasher or may be in the form of a separate physical unit and can be operatively connected, for example, to a control system of the dishwasher.

A second substep 122 of the final-washing process 116 is carried out following the first substep 120. In this second substep 122, the washware is acted on by a second rinse liquid which comprises at least one permeate which is produced by means of reverse osmosis. The said permeate may be, for example, wholly untreated permeate from a reverse-osmosis system, for example ultrapure water.

This permeate is, in principle, extremely pure and is generally also free of bacteria since it is preferably not stored in any container over a relatively long period of time but can be produced as required for the respective final-washing process or the second substep 122. In order to improve the drying effect of the washware, this permeate or this second rinse liquid may, for example, be heated in a boiler or by means of a flow heater, before this second rinse liquid is applied to the washware, for example sprayed over the said washware.

The reverse-osmosis systems which are required for the second substep 122 are known per se from the prior art. Such reverse-osmosis systems can be used to treat, for example, line water, that is to say to free the said line water of virtually all floating and also dissolved constituents, independently of the on-site conditions, in such a way that a conductance of, for example, less than 80 μS is achieved in the permeate. Water which has a similarly low conductance does not leave behind any visible residues upon drying or evaporation.

The cleaning program can then be terminated in method step 118, for example analogously to the above-described method according to FIG. 1.

Figure 3:
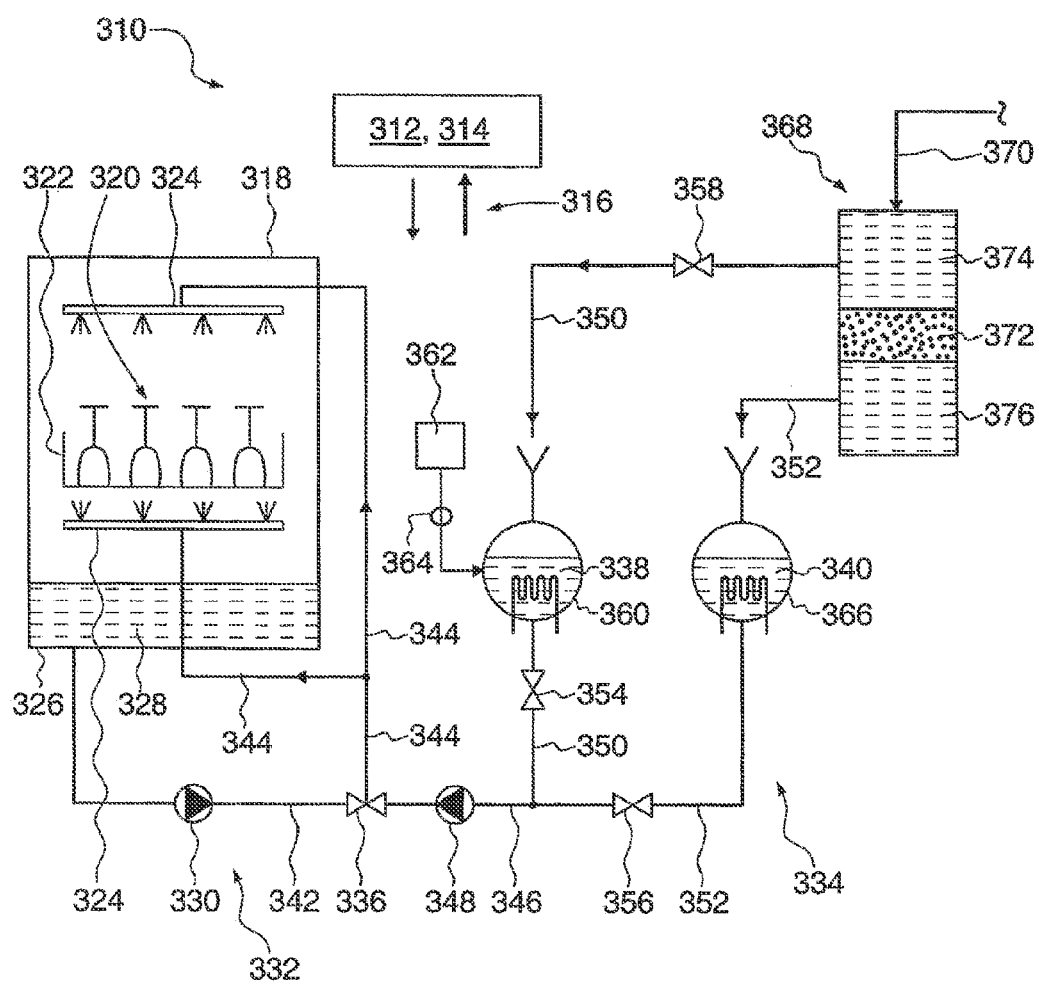
FIG. 3 shows a schematic illustration of a possible embodiment of a cleaning apparatus according to the invention.

FIG. 3 schematically illustrates a possible exemplary embodiment of a cleaning apparatus 310 according to the invention. This cleaning apparatus 310 may comprise, for example, a control system 312 which may be designed, for example, to carry out a method according to the invention on the cleaning apparatus 310, for example a method according to the exemplary embodiment described in FIG. 2. The control system 312 may also comprise a regulation system 314 in order to regulate various processes in the cleaning apparatus 310. The control system 312 may be completely or partly in the form of a data-processing apparatus, so that a cleaning program can be implemented in this control system 312, for example using program technology. Other electronic and/or mechanical components may also be present in the control system 312. The control systems 312 may be in the form of a central or decentralized control system and may be connected to other components of the cleaning apparatus 312, for example, by means of one or more interfaces which are symbolically denoted by a reference numeral 316 in FIG. 3.

In the illustrated exemplary embodiment, the cleaning apparatus 310 is in the form of a dishwasher and comprises a cleaning chamber 318. The cleaning apparatus 310 is preferably a single-chamber dishwasher in which washware 320 is introduced into the cleaning chamber 318, for example in a stationary manner, for example by means of one or more dish racks 322. In this cleaning chamber 318, said washware 320, which is illustrated in the form of glasses in the present exemplary embodiment, may be acted on by cleaning liquid or rinse liquid, for example by means of a spray system 324. In the exemplary embodiment according to FIG. 3, a single spray system 324 is provided in this case. However, refinements with a plurality of spray systems 324 are also possible in principle, for example separate spray systems 324 for a wash process and a final-washing process.

The lower region of the cleaning chamber 318 is in the form of a wash tank 326. From this wash tank 326, wash liquid 328 is recirculated by means of a wash circuit 332 containing a circulation pump 330, for the wash process 112 described in FIG. 2. In the process, the wash liquid 328 is sprayed onto the washware 320 several times by means of the spray system 324, drains from said washware back into the wash tank 326, in order to be sprayed again by means of the circulation pump 330 and the spray system 324. The cleaning apparatus 310 may comprise additional components which are not illustrated in FIG. 3, for example one or more filters and/or valves which can control and/or assist this recirculation process.

In the exemplary embodiment illustrated in FIG. 3, the cleaning apparatus 310 also comprises a final-washing circuit 334 which is separate from the wash circuit 332. The spray system 324 can be incorporated in this final-washing circuit 334 by means of a changeover valve 336 which is activated, for example, by the control system 312. In the process, the washware 320 is preferably only acted on simply by rinse liquids 338, 340. The term "final-washing circuit" therefore does not necessarily imply circulation of the rinse liquids 338, 340 but also that the washware 320 can be acted on simply by these rinse liquids 338, 340. The rinse liquids 338, 340 can drain, for example into the wash tank 326, after acting on the washware 320, and therefore the wash liquid 328 is treated with these rinse liquids 338, 340.

Whereas the wash tank 326 in the exemplary embodiment illustrated in FIG. 3 is connected to the changeover valve 336 by means of a wash line 342 which comprises the circulation pump 330, said changeover valve in turn being connected to the spray system 324 by means of the spray line 344, that end of the changeover valve 336 which is opposite the wash line 324 is connected to a final-washing line 346. This final-washing line 346 may optionally contain a pressure-increasing pump 348 which, however, may also be accommodated in the spray lines 344 for example. As an alternative, pressure may also be directly applied to the rinse liquids 338, 340, for example by means of the on-site line pressure.

The final-washing line 346 is divided into a first final-washing line 350 and a second final-washing line 352. Further valves 354, 356, 358, which can be used, for example, to control the final-washing process, can optionally be provided in these final-washing lines 350, 352, and also in the final-washing line 346 and in the other lines illustrated in FIG. 3. Various refinements are feasible.

In order to carry out the above-described first substep 120 of the final-washing process 116, the cleaning apparatus 310 according to FIG. 3 comprises a first final-washing tank 360 which is connected to the changeover valve 336 via the first final-washing line 350 and the final-washing line 346. This first final-washing tank 360, which may, for example, be in the form of a boiler, or may comprise another type of heating apparatus or can be connected to another type of heating apparatus, accommodates the first rinse liquid 338. As described above, this first rinse liquid 338 may be, for example, water. A disinfectant, for example a rinse agent with a disinfectant component, can be admixed with this first rinse liquid 338 by means of a metering apparatus 362. This meeting apparatus can, for example, be monitored by means of a sensor 364, for example by means of a throughflow sensor. In this way, the concentration of disinfectant in the first rinse liquid 338 can be monitored.

It should be noted that the use of the first final-washing tank 360 according to FIG. 3 is optional. Direct metering of the disinfectant, for example into line water which is supplied via a fresh-water line, is also feasible. Therefore, the supplied fresh water, as first rinse liquid 338, could be directly heated, for example by means of a flow heater, for example (and also in the case of use of a boiler) to a temperature of 49° C. The disinfectant can be admixed subsequently or beforehand. Other ways of admixing the disinfectant are also feasible in principle. Metering, for example by means of the signals from the sensor 364, can be controlled and/or regulated, for example, by the control system 312 or the regulation system 314.

Furthermore, in the exemplary embodiment illustrated in FIG. 3, the final-washing circuit 334 optionally comprises a second final-washing tank 366 which is likewise illustrated in the form of a boiler again. However, another refinement is again possible here, for example a refinement without a second final-washing tank 366, in which a second rinse liquid 340 which flows directly through the second final-washing line 352 is used, instead of a storage of the second rinse-liquid 340 in this second final-washing tank 366.

The second final-washing tank 366 is connected to a reverse-osmosis system 368. This reverse-osmosis system 368 may be an integral constituent part of the cleaning apparatus 310, but it may also be in the form of an external reverse-osmosis system 368.

The reverse-osmosis system 368 is connected to a fresh-water line 370 and is indicated only symbolically in FIG. 3. The said reverse-osmosis system has a membrane 372 which separates a concentrate 374 from a permeate 376. The membrane 372 is in the form of a semipermeable membrane and is permeable to water molecules for example, but impurities, for example mineral impurities, organic impurities or biological impurities, are retained. As described above, the fresh water is acted on by a pressure on the concentrate side, the said pressure being higher than the osmotic pressure. As a result, water molecules are pressed through the semipermeable membrane 372, whereas impurities remain on the side of the concentrate 374. As a result, an osmotic pressure which counteracts the externally applied pressure builds up. As soon as the applied pressure and the osmotic pressure are equal, an equilibrium is established, or, as long as the externally applied pressure is higher than the pressure on the permeate side 376, water molecules are displaced to the permeate side.

The permeate 376, which is ultrapure water in this case, is used as the second rinse liquid 340. To this end, the side of the permeate 376 of the reverse-osmosis system 368 can be connected to the second final-washing tank 366, for example, via the second final-washing line 352, in order to perform heating there. Direct use of the permeate side 376 of the reverse-osmosis system 368 as a supply tank for storing the second rinse liquid 340 is also feasible, it then being possible, for example, for the second rinse liquid 340 to be heated by means of a flow heater. In this respect, the refinement with an additional second final-washing tank 366 according to FIG. 3 is not necessarily required.

As illustrated in FIG. 3, the concentrate side of the reverse-osmosis system 368 can be connected to the first final-washing tank 360, for example, via the first final-washing line 350, and therefore the concentrate 374 can be used as a constituent of the first rinse liquid 338. In addition, it is possible, but not illustrated in FIG. 3, for the first final-washing tank 360 to also be connected to a further fresh-water line 370. In this way, the concentrate 374 can be additionally mixed with fresh water. The use of the concentrate 374 as a constituent of the first rinse liquid 338 can greatly reduce the use of fresh water.

Reference can largely be made to the description of FIG. 2 for the possible manner of operation of the cleaning apparatus 310 according to FIG. 3. The wash circuit 332 is used to carry out the wash process 112. While carrying out the wash process, it is possible, for example, for the first rinse liquid 338 to already be treated in the first final-washing tank 360, that is to say, for example, by heating and/or by adding the disinfectant. Furthermore, it is possible to treat the permeate 376 in the reverse-osmosis system 368 in parallel with respect to time or with a time delay, optionally followed by heating in the optional second final-washing tank 366. However, exclusive storage of the permeate 376 in the reverse-osmosis system 368 is also feasible.

After the end of the wash process, the final-washing process is started by switching over the changeover valve 366 and possibly by starting the pressure-increasing pump 348 (other refinements are also feasible, for example refinements solely with the pressure-increasing pump 348 and without a changeover valve 336, or refinements which dispense with the valves 336, 354 and 356 and, for this, additionally use a pressure-increasing pump in each branch 350 and 352). In the process, it is possible, in order to carry out the first substep, for, for example initially, only the valve 354 to be open, whereas the valve 356 is closed. As a result, the first rinse liquid 338 is pumped out of the first final-washing tank 360, by means of the pressure-increasing pump 348, to the spray system 324, in order to wash off the adhering wash liquid from the washware 320. After the end of the first substep, the valve 354, for example, can then be closed, in order to open the valve 356. Then, in the second substep of the final-washing process, permeate 376, preferably without the addition of additional components, is sprayed onto the washware 320 by said permeate being pumped to the spray system 324 by means of the pressure-increasing pump 348.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for treating washware, in particular dishes, the method comprising:
   subjecting the washware to at least one washing process, with adhering dirt being at least largely removed; and
   subjecting the washware to a final-washing process after the at least one washing process, the final-washing process having at least two substeps, the washware being acted on by a first rinse liquid in a first substep, the first rinse liquid containing a concentrate which is produced during reverse osmosis and a disinfectant, the first substep being carried out with the first rinse liquid at a temperature of between 40° C. and 70° C., and the washware being acted on by a second rinse liquid in a subsequent second substep, wherein the second rinse liquid comprises at least one permeate that is produced by reverse osmosis, the second rinse liquid being heated to a temperature of between 24° C. and 55° C.

2. The method according to claim 1, wherein the second rinse liquid is substantially free of rinse-aid additives.

3. The method according to claim 1, wherein the second rinse liquid is heated to a temperature of 49° C.

4. The method according to claim 1, wherein the first substep is carried out with the first rinse liquid at a temperature of 49° C.

5. The method according to claim 1, wherein a quantity and/or a concentration of the disinfectant that is added in a metered manner to the first rinse liquid is detected.

6. The method according to claim 1, wherein a signal, an acoustic signal, an optical signal, or an electrical signal, is output when the quantity and/or concentration deviates from a predetermined desired value and/or from a desired range.

* * * * *